July 14, 1936. F. W. HUDSON Re. 20,033
SOFT RUBBER PLUG AND SOCKET BODY
Original Filed Feb. 23, 1928
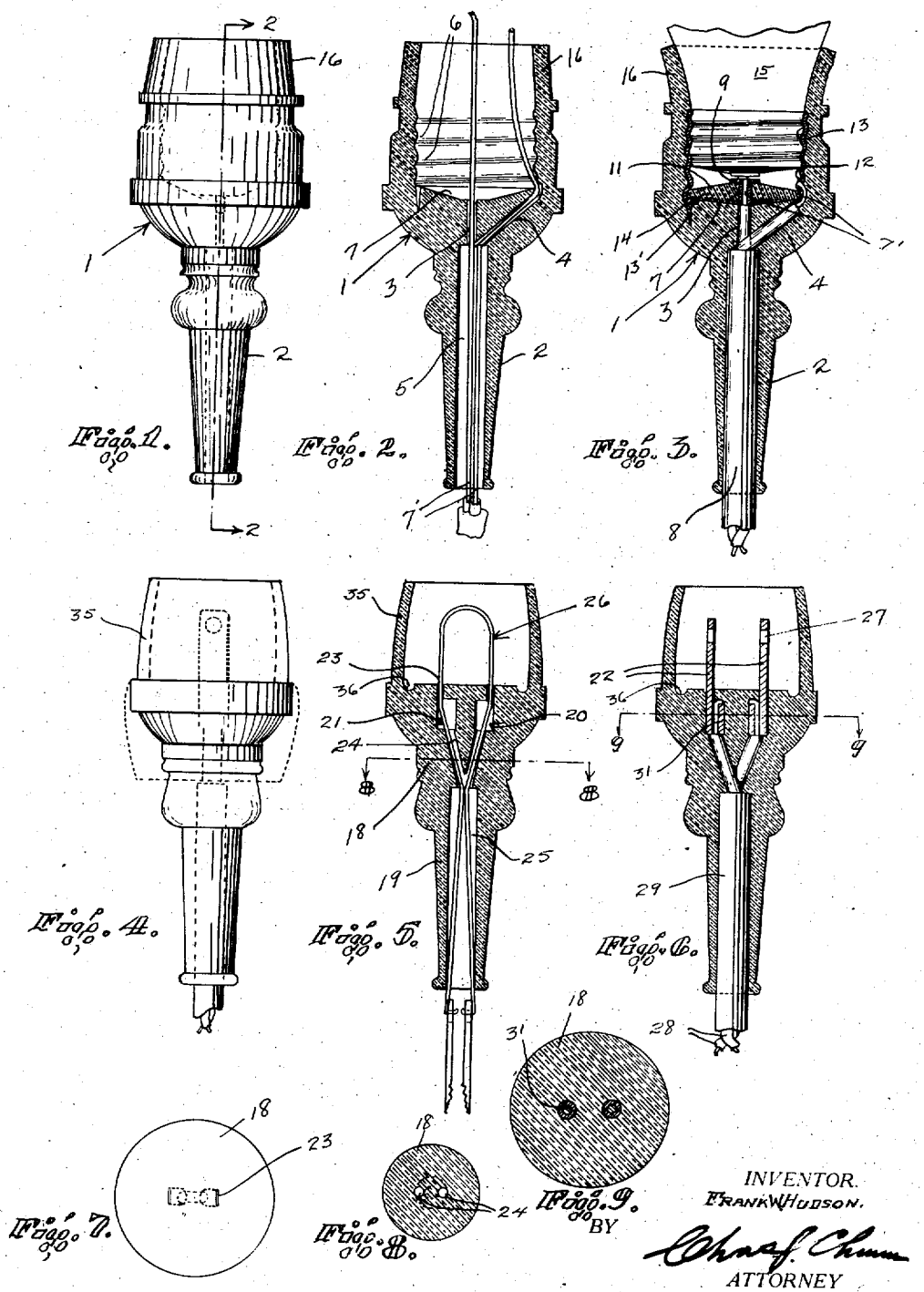
INVENTOR.
FRANK W. HUDSON.
BY
Chas. J. Chum
ATTORNEY Reissued July 14, 1936 Re. 20,033

UNITED STATES PATENT OFFICE 20,033

SOFT RUBBER PLUG AND SOCKET BODY

Frank W. Hudson, Los Angeles, Calif.

Original No. 1,724,592, dated August 13, 1929, Serial No. 256,362, February 23, 1928. Application for reissue February 11, 1935, Serial No. 6,084

17 Claims. (Cl. 173—358)

This invention resides in the provision of unbreakable plug and socket fittings which are adapted for attachment to the terminals of electrical conductors, the said fittings being constructed of soft, elastic material such as rubber, and arranged whereby the contact elements which form the plug and socket devices together with the terminals of the electrical conductors may be readily and easily incorporated therewith. This will provide unbreakable plug and socket devices which will be waterproof and much more desirable than the present popular types of plug and socket construction wherein the bodies of these constructions are made of hard brittle substances.

An object of the invention is to provide soft rubber plug and socket fittings or bodies which are adapted for connection to the nds of rubber encased conductor cords in such manner that the cord, including the plug and socket fittings are virtually a one piece construction but subject to ready and easy disassembling in order to repair and renew parts of the plug and socket constructions in case of breakage or derangement of any of the parts. Such disassembling may be satisfactorily accomplished, for example, by withdrawing the ends of said rubber encased conductor cords, together with their terminal fittings, from the soft rubber bodies.

A further object is to provide soft rubber plug and socket members of the character described which make possible the making up of electrical conductor cords of various lengths as desired, to suit the particular "job" or work in a much easier and more effective manner than is now possible with the type of equipment at present generally employed.

I am aware of plug and socket constructions for electrical conductor cords in which the plug and sockets are composed of soft rubber enlargements or bodies molded onto the ends of conductors and around the contact elements which comprise the plug and socket devices. This type of construction does not permit of repair of the plug and socket parts inasmuch as said parts are molded in the soft rubber bodies in such manner that said bodies have to be torn apart and destroyed in order to gain access to the conductors and contact elements. Furthermore, conductor cords of this type must be factory made and when once made up cannot be disassembled and the parts thereof used again in order to provide longer or shorter cords. In other words, these cords cannot be made "on the job" to suit the particular requirements at hand.

By providing plug and socket bodies of soft, resilient rubber molded into particular form and shape in accordance with this invention, I secure all of the advantages of the above disclosed types of rubber plug and socket devices without any of the above mentioned disadvantages and with many added advantages. The rubber plug and socket fittings of this invention are capable of being readily and easily made up into plugs and sockets and joined to conductor cords of various lengths "on the job" to suit the particular requirements of the work. The conductors made with the device of this invention do not have to be assembled at factories or other like places, inasmuch as the molding of the rubber bodies around the conductors and contact elements is not required. The plug and socket rubber fittings of this invention have passages and recesses formed therein at the time of the molding of the fittings. The passages and recesses are of a nature such that the plug and socket contact elements may be readily and easily fitted into place therein and will remain in place, due to the resiliency of the rubber bodies and the gripping action afforded thereby. The incorporation of the conductor cords with said bodies is effected in like manner. In both instances, these bodies are stretched to accommodate the contact members and conductors so that when these elements are in place in the bodies, they will be securely gripped and held in the pre-formed passages and recesses, but are, however, subject to being removed for the purpose of repair and renewing the parts and connections which may become broken.

With the above mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

Referring to the drawings:

Fig. 1 represents a side elevation of a soft rubber socket fitting constructed in accordance with this invention.

Fig. 2 represents a sectional view taken on the plane of line 2—2 of Fig. 1 showing one of the steps required to connect the conductors with the socket body.

Fig. 3 represents a sectional view similar to Fig. 2 but showing the finished construction with the socket contact elements and conductors in place and an electric light bulb screwed into the socket.

Fig. 4 represents a side elevation of a plug constructed in accordance with the invention showing it attached to conductor terminals.

Fig. 5 represents a vertical sectional view of the rubber body with the contact elements removed but showing the means and method of incorporating the contacts and conductors with said body.

Fig. 6 represents a vertical sectional view of the plug of the invention as when completed.

Fig. 7 represents a top plan view of the plug body with the contact elements assembled, showing the openings in one end of the plug body through which the contact elements extend.

Fig. 8 is a sectional view taken on the plane of line 8—8 of Fig. 5.

Fig. 9 is a cross sectional view taken on the plane of line 9—9 of Fig. 6.

In carrying out the invention I provide plug and socket body members of soft compressible and resilient rubber, which members are molded so as to provide recesses and passages therein, which recesses and passages will permit of the incorporation and the holding of contact elements and electrical conductors therewith in an easy and expeditious manner.

As shown in Figs. 1 to 3 inclusive, the socket body member made in accordance with this invention comprises a soft rubber socket-like body portion 1, from the closed end of which a tubular soft rubber extension 2 projects, said extension being several inches or more in length and formed integral with the socket body portion 1. The closed end of the body portion 1 is rounded and tapered so as to merge with the tubular extension 2, which latter is tapered towards its outer end so that it increases as to flexibility towards its free end. This plug body and extension are, of course, molded so that the finished product will be soft, compressible and highly resilient, and will have pre-formed recesses and passages of a definite shape. The mold means also provides for the formation of small, narrow passages 3 and 4 extending from the inner end of the bore 5 of the tubular extension 2 through the body 1 into the socket space provided by the body. The annular wall of the socket space 1 is provided with screw threads 6 formed in the molding of the entire fitting, and a depression 7 is formed in the bottom of the socket space in the same manner. The passage 3 leads to the center of the depression, the passage 4 to the edge of the depression. The electrical conductors 7′ are stripped of their insulation so as to leave them bare and exposed for a considerable length, and these bare portions or terminals of the conductors are extended into the tubular member 5, and through the passages 3 and 4, then up through the socket space of the body, where they may be grasped and pulled upward in order to bring the unbared portions of the conductors into the tubular extension 2 to the extent, for example, as shown in Fig. 3. The conductor cord is selected so that with the covering thereon as indicated at 8, it may be caused to fit snugly in the bore 5 of the tubular extension 2, the rubber being stretched to accommodate the conductor, thereby insuring a tight gripping of the conductor.

It is preferable to employ rubber encased conductor cords and when used, a better fit is provided and the finished cord will have the appearance of a one-piece rubber construction. After the conductors are pulled into place as shown in Fig. 3, their bared terminals are cut off in the desired length. One of the terminals is inserted upward through a tubular brass contact member 9 mounted in the center of a disk 11 of insulation material, which disk rests in the depression 7. The other terminal is extended through an opening indicated at 12 in a screw threaded cylindrical socket contact member 13, which latter is mounted in the socket space of the body portion 1 and cooperates with the screw threads 6. The size of the contact member 13 is such that the rubber must be stretched and placed under tension in order to secure and fit said contact member in place. Thus, said member will be effectively gripped. The contact member 13 is provided with an inwardly extending annular flange 14 at its inner end, which flange supports the insulation disk 11 and comes into such frictional contact with the depression 7 that it assists in preventing the unintentional rotation or turning of the contact member when an electric light, indicated at 15, or other electrical appliance, is screwed into or removed from the socket. The terminals of the conductors are preferably soldered to the contact members 9 and 13 and by this arrangement the contact members are additionally anchored in place. The contact member 13 is provided with a spur 13′ which will bite into the rubber and assist in holding said contact member against accidental turning in the rubber body. The socket in the body portion 1 is preferably of such depth that there will be provided an annular flexible, soft rubber skirt portion 16 extending considerably outward beyond the outer end of the contact member 13 so that it may be engaged with the electric light 15 or other electrical appliance screwed into the socket, to form a tight joint and to provide a waterproof connection, this being particularly illustrated in Fig. 3. In drawing the conductors through the passages 3 and 4, any suitable fishing tool such as a wire as shown in Fig. 5, may be employed. The openings and passages adapted to accommodate the contact members and conductors are smaller than the contact members and conductors so that the rubber of the body is stretched considerably in forcing and fitting the contact members and conductors in place. This causes the contact members and conductors to be effectively gripped and held in place without destroying the resiliency, softness and compressibility of the rubber body. All of the non-resilient, hard portions of the plug of this invention such as the contact members 13 and disk 11, and the bared portions of the conductors are completely covered and protected by the soft rubber body. Thus if the socket of this invention is forcibly thrown against a hard object or dropped, no breakage or damage to the parts will take place. Should it become necessary to replace a contact member of the socket or to fix a disconnected terminal in any way, the parts may be readily removed without damaging the rubber body and new parts readily and easily put in as well as new connections made. It will thus be seen that the socket of this invention may be readily disassembled or taken off of a cord and a longer or shorter cord may be quickly and easily attached as desired.

Figs. 4 to 9 inclusive show the rubber plug fitting of this invention in the form of a solid rubber body portion 18, made up of soft, compresible, resilient rubber and having a tubular extension 19 corresponding to the extension 2 of the socket body member, said extension increasing in flexibility towards its free end, due to its being tapered. The body 18 is molded so that there will be formed interiorly thereof, sockets or recesses 20 and 21 for reception of the usual type of plug contact members 22. Extending from these sockets or recesses out through one end of the plug, are narrow slit-like openings or passages 23, and extending inwardly from said sockets are similar passages 24 which lead into the bore 25 of the tubular extension.

In assembling the plug, a wire 26 is doubled and the ends inserted downward through the slit-like openings 23, the sockets 21, the passages 24, and into and through the bore 25 so that the free ends are extended beyond the tubular extension 19. These free ends are then hooked through the openings 27 in the contact members 22 to which contact members 22, the conductors 28 are fastened. The operator then pulls the bared terminals of wire 26 so as to draw the contact members 22 through the bore 25, passages 24, and into the sockets 21 in such manner that the said contact members will extend outward from the plug body through the slit-like openings 23, the wires or conductors 28 being drawn into the passages 24 as shown in Fig. 6. The rubber casing 29 for the conductor cord, is drawn into the bore 25 of the tubular extension with a tight fit after it has been trimmed back to fit said bore, as indicated in Fig. 6. This method of assembling is quick and effective, and reliable. The portions of the body accommodating the inserted parts are stretched in order to accommodate said parts so that they are securely gripped and held in place. The socket portions 21 are larger than the passages 23 and 24 and accommodate the enlarged portions 31 at the inner ends of the contact members, to which enlarged portions the terminals of the conductor cord 28 may have been soldered, or otherwise secured prior to the time they were drawn upward into position. In this way, the contact members are securely anchored in the body and are gripped and held therein in substantially the same manner as though the body were molded around these contact elements. However, the contact elements, together with the conductors may be pulled out of place in order to renew or replace them as required. It will thus be seen that the plug of this invention may be quickly and easily fitted onto the terminals of conductor cord. By using the rubber encased conductors, a tight joint is provided and the cord will have the appearance of being made of a one piece rubber plug. The plug body is molded so that there is formed a protective soft rubber cylindrical skirt portion 35 which surrounds the plug contact members. This skirt will engage any female element cooperating with the plug so as to form a waterproof joint. If desired it may be folded back as indicated in dotted lines in Fig. 4. The groove 36 provides for an easy bending or folding back of the skirt to leave a flat end on the outer face of the plug. Due to the tight fit of the contact members and conductors, the plug is made waterproof yet the entire plug is soft and compressible such that it will not be subject to cracking or breaking when dropped upon or struck against hard objects. The soft rubber body members of this invention are so constructed that when the contact members and conductors are incorporated therewith in accordance with this invention, said contact members and conductors will be gripped and held in position to properly function. Due to the stretching of the rubber when said contact members and conductors are put in place, and to the resilient gripping action of the rubber, it is unnecessary to employ screws, clamps or any fastening means of an extraneous nature.

One of the advantages of the invention is that the rubber plug and socket fittings are salable as complete units subject to "on the job" attachment with conductor cords whereas other types of soft rubber socket and plug bodies must be assembled and joined to the conductors at the factory with expensive and complicated molds and machinery. Therefore a saving in weight and space, and cost may be effected in shipping the molded units of my invention independent of the wire or conductor. In this way standard types of wire and cables at hand "on the job" may be used to provide complete extension cords or cables having the soft rubber terminals. With the other types, special conductors must be used at the factory to make up the extension cords or cables.

For want of a term which will more aptly and specifically describe the female and male terminal elements 13 and 22 respectively, resiliently held in corresponding recesses in the soft rubber bodies, said terminal elements have been designated throughout the specification and claims as "contact members." It will be understood that this term, while including all substantial equivalents of the terminal elements shown and described, is not so comprehensive as to include the conventional, hard, terminal-containing plug or socket casings of the type which are sometimes fitted within recesses or passages of soft rubber protective sheathings. An example of the excluded type is illustrated in Patent Number 1,286,228.

I claim:

1. A fitting for connection with the terminal of an electrical conductor comprising a soft rubber body member having a preformed passage therein adapted to detachably receive and hold an electrical conductor of the same general shape but of a size greater than the passage whereby the rubber of the body is stretched and under tension when the conductor is received in the passage thereof, and said body being provided with a recess communicating with said passage and containing a contact member of a size greater than the recess.

2. A terminal fitting for electrical conductor cords comprising a soft rubber body member having a preformed passage of non-uniform size extending therethrough, a contact member detachably mounted in a portion of the passage and held against unintentional removal by the gripping action of the soft rubber of the body, and an electrical conductor connected with the contact member and extending into and being held in another portion of the passage by the inherent resiliency of the rubber body.

3. A terminal fitting for an electrical conductor comprising a soft rubber body, a recess in one side of said body, a contact member fitted within said recess, said contact member being of such size and shape as to deform the adjacent portions of the soft rubber body, and a passage leading into another side of said body, said passage being in communication with said recess.

4. A terminal fitting for an electrical conductor, comprising a resilient and deformable body, a recess in one side of said body, a contact member detachably fitted within said recess, said contact member being of such size and shape as to engage portions of the resilient walls of the recess to yieldingly resist its movement with respect thereto, and a passage in communication with said recess and with the outer surface of said rubber body to receive the end of an elongated smooth electrical conductor.

5. In the device defined in claim 4, said passage being uniformly shaped in cross section throughout its length.

6. In the device defined in claim 4, said resilient body being provided on its recessed side with an integral skirt projecting outwardly substantially beyond any portion of said contact member and adapted to form a receptacle for an electrical attachment, the inner diameter of said skirt being less at its outer extremity than adjacent said contact member.

7. In the device defined in claim 4, the recessed side of said resilient body having a substantially flat surface, and a soft rubber skirt projecting outwardly from and around said flat surface and substantially beyond the outer extremity of said contact member said skirt being reversible to expose said contact member and said flat surface.

8. A waterproof terminal assembly for an electrical conduit, comprising a body member having recesses therein, contact members having the basal portions thereof detachably fitted in said recesses, a flexible soft rubber skirt projecting outwardly from said body and beyond the contact members, said skirt having an open end, a soft rubber extension on said body having a tubular passage therein for sealingly and detachably receiving a correspondingly shaped electrical conduit, and additional passages entirely within said body connecting said recesses with the inner end of said tubular passage.

9. A device of the character described comprising an electrical conductor, a soft rubber body having a preformed recess and a preformed passage therein receiving a contact member and a conductor located respectively in said recess and said passage, which latter are of larger size than the recess and the passage, thereby causing the rubber of the body to be stretched and placed under tension, the terminal of said conductor being in electrical contact with said contact member.

10. A terminal fitting for an electrical conductor, comprising a one-piece, resilient and deformable rubber body, there being a recess in one side of said body and a passage in communication with said recess and with the outer surface of said rubber body, a prong-type contact member and an elongated, smooth-surfaced insulated electrical conductor connected thereto, said recess being of such size as to prevent passage of the insulated conductor therethrough, said contact member being detachably fitted within said recess and projecting therefrom, and said passage serving to receive the adjacent end portion of said conductor, said passage constituting means of access to said recess to permit insertion of the contact member into said recess through said passage from the conductor side of the body whereby the connection of said conductor to the contact member may be effected before assembling the conductor and contact member with the body, said contact member being of such size and shape relative to the size and shape of said recess and passage as to necessitate distortion of a portion of the body to permit said insertion of the contact member and such as to engage portions of the resilient walls of the recess when fitted therein to stretch the same to yieldingly resist its movement with respect thereto, said body constituting the main supporting element of the fitting and being of such predetermined size and shape that said stretching of the body is substantially confined to the interior thereof so that the external size and shape of the body are not visibly altered by the contact prong when finally positioned in the body.

11. A terminal fitting for an electrical conductor, comprising a one-piece, molded, resilient rubber body having a pair of spaced prong-positioning recesses in one side of said body, a single conductor-receiving-passage in another side of said body, and holes between the inner ends of said recesses and said passage through which holes communication is effected between the respective recesses and said passage, and a pair of contact prongs each having an insulated electric conductor secured thereto, said contact prongs being simultaneously insertible through the passage and the respective holes into said recesses after said wires are connected to the respective prongs, said prongs being of such size and shape relative to the size and shape of said passage, holes and recesses as to necessitate distortion of the body in order to permit insertion of the prongs whereby, after the prongs have emerged from said passage into said recesses, the resiliency of the body is effective to cause the distorted body to return to normal condition and incidentally to position the inner end portions of the prongs in said recesses, the size and shape of said prongs also being such that the latter, when positioned in said recesses, engage portions of the resilient walls of the recesses to yieldingly resist movement of the prongs relative to the recesses, and seats in the body for engaging portions of the prongs when positioned in said recesses, for resisting inward displacement of the prongs, that portion of the body which is located between the prongs serving to resiliently maintain said prongs in properly spaced parallel relationship.

12. A terminal fitting for an electrical conductor comprising a soft, resilient, one-piece rubber body having a recess extending from one end of and part way into the body, a passageway extending from the opposite end part way into the body, and a hole of smaller size than said passageway connecting the passageway with said recess, a prong type contact member fitted within the recess and an insulated electrical conductor fitted within said passageway and connected through said hole to said contact member, said contact member being insertable through said passageway and hole to position in said recess after connection to said conductor and being of a size to make it necessary to deform the adjacent portions of the soft rubber body during such insertion of the contact member and also of such size and shape as to engage portions of the resilient walls of said recess, when fitted therein, to yieldingly resist its movement with respect thereto, and said recess being formed with a seat at its bottom against which the inner end of the contact member bears to resist inward displacement in the normal use of the fitting.

13. A terminal fitting for an electrical conductor comprising a soft, resilient, one-piece rubber body having a recess extending from one end of and part way into the body, a passageway extending from the opposite end part way into the body, and a hole of smaller size than said passageway connecting the passageway with said recess, a prong-type contact member fitted within the recess and an insulated electrical conductor fitted within said passageway and connected through said hole to said contact member, said contact member being insertable through said passageway and hole to position in said recess after connection to said conductor and being of a size to make it necessary to deform the adjacent portions of the soft rubber body during such insertion of the contact member and also of such size and shape as to engage portions of the resilient walls of said recess, when fitted therein, to yieldingly resist its movement with respect thereto, and said recess being formed with an enlarged socket portion at its inner end and with a seat at its bottom against which the inner end of the contact member bears to resist inward displacement in the normal use of the fitting, the connection of the conductor to said contact member forming an enlargement adapted to be received within said enlarged socket.

14. A terminal fitting for an electrical conductor, comprising a one-piece, resilient and deformable rubber body, said body constituting the main supporting element of the fitting and having a pair of recesses in one side thereof, a pair of elongated relatively wide but thin contact members respectively detachably fitted within said recesses and having portions projecting outwardly from said side of the body, said contact members being of such size and shape that substantial areas of their surfaces engage portions of the resilient walls of the recesses to yieldingly resist movement of the prongs relative to the recesses, and a passageway in communication with said recesses and with the outer surface of said rubber body to receive the end of an elongated, smooth-surfaced, duplex electrical conductor, the wires of which conductor are respectively connected to said contact prongs.

15. A terminal fitting for an electrical conductor comprising a one-piece, resilient and deformable rubber body, said body constituting the main supporting element of the fitting and having a pair of recesses in one side thereof, a pair of elongated, relatively wide, thin contact members respectively detachably fitted within said recesses, said contact members being of such size and shape that said recesses are expanded by the prongs so that substantial surface areas of the respective prongs engage portions of the resilient walls of the recesses tc yieldingly resist movement of the prongs in the recesses, said body being of such size and shape that said expansion of the recesses causes compression of internal portions of the body without noticeable alteration of the external size and shape of the body, thereby providing adequately firm support for said prongs, said body also having a passage in communication with said recesses and with the outer surface of said rubber body to receive the end of an elongated, smooth-surfaced, duplex electrical conductor, the wires of which conductor are respectively connected to said contact prongs.

16. A terminal fitting for an electrical conductor, comprising a soft, resilient, one-piece rubber body having a pair of relatively spaced recesses in one side of said body, a pair of prong-type contact members respectively having portions fitted within said recesses and having portions projecting outwardly from said side of the body, and said body also having a passage leading into another side of said body intermediate the locations of said recesses, there being a pair of holes in said body between said recesses and passage, said passage being in communication with said recesses through said holes, said passage and holes constituting means of access to said recesses to permit insertion therethrough of the contact members into the respective recesses after the connection of the wires of a duplex electric conductor respectively to said contact members, said passage, holes and recesses being so arranged as to form a pair of tortuous channels through the body and said contact members being of such size and shape as to make it necessary to deform the adjacent portions of the soft-rubber body in order to insert the contact members, the size and shape of said contact prongs also being such that the latter, when fitted in said recesses, engage portions of the resilient walls of the respective recesses to yieldingly resist movement of the prongs relative to the recesses, and a seat in the body at the bottom of each of said recesses engaging the inner ends of the respective contact members to resist inward displacement of the latter in the normal use of the fitting.

17. A terminal fitting for an electrical conductor, comprising a soft, resilient, one-piece rubber body having a pair of relatively spaced recesses in one side of said body, a pair of prong-type contact members respectively having portions fitted within said recesses and having portions projecting outwardly from said side of the body, and said body also having a passage leading into another side of said body intermediate the locations of said recesses, there being a pair of holes in said body between said recesses and passage, said passage being in communication with said recesses through said holes, said passage and holes constituting means of access to said recesses to permit insertion therethrough of the contact members into the respective recesses after the connection of the wires of a duplex electric conductor respectively to said contact members, said passage, holes and recesses being so arranged as to form a pair of tortuous channels through the body and said contact members being of such size and shape as to deform the adjacent portions of the soft rubber body when the contact members are being so inserted, the resiliency of the body being sufficient to restore the distorted portions thereof to normal condition, the size and shape of said contact prongs also being such that the latter, when fitted in said recesses, engage portions of the resilient walls of the respective recesses to yieldingly resist movement of the prongs relative to the recesses, and the body having a pair of seats respectively adapted, after restoration of the body to normal to engage the inner ends of the respective contact members to resist inward displacement thereof in the normal use of the fitting.

FRANK W. HUDSON.